United States Patent [19]

Kub et al.

[11] Patent Number: 4,931,674

[45] Date of Patent: Jun. 5, 1990

[54] PROGRAMMABLE ANALOG VOLTAGE MULTIPLIER CIRCUIT MEANS

[75] Inventors: Francis J. Kub, Severna Park; Ingham A. Mack, Laurel; Keith K. Moon, Beltsville, all of Md.

[73] Assignee: United States of America as represented by the Secretary of the Navy, Washington, D.C.

[21] Appl. No.: 271,820

[22] Filed: Nov. 16, 1988

[51] Int. Cl.[5] .......................... G06G 7/00; H03F 3/16
[52] U.S. Cl. ................................... 307/529; 328/160; 307/512; 307/497; 307/246
[58] Field of Search ............... 307/110, 264, 497, 529, 307/362, 363, 482, 578, 270, 246; 328/160; 363/60

[56] References Cited

U.S. PATENT DOCUMENTS

| | | | |
|---|---|---|---|
| 3,562,553 | 2/1971 | Roth | 328/160 |
| 3,588,713 | 6/1971 | Yareck | 307/497 |
| 4,649,289 | 3/1987 | Nakano | 307/304 |
| 4,677,317 | 6/1987 | Sakuma | 307/443 |
| 4,710,726 | 12/1987 | Czarnul | 328/127 |
| 4,734,599 | 3/1988 | Bohac, Jr. | 307/497 |
| 4,764,892 | 8/1988 | Thomas | 328/16 |

Primary Examiner—Stanley D. Miller
Assistant Examiner—Richard Roseen
Attorney, Agent, or Firm—Thomas E. McDonnell; Elmer Goshorn

[57] ABSTRACT

An improved programmable analog voltage multiplier circuit means (PAVMCM) including various embodiments thereof that are operable in linear/nonlinear fashion. The PAVMCM is generally made up of multiplier circuit means, at least one switch means and at least one capacitor means. The switch means is connected to a programmable analog voltage (PAV) input and the capacitor means. The circuit means is composed of a high impedance analog voltage (HIAV) programming input, an analog voltage input and current source output means. The capacitor means is connected to the switch means and the HIAV programming input. The capacitor means receives and dynamically stores a PAV input when the switch is closed and then applies the dynamically stored PAV input to the HIAV programming input of the circuit means when the switch is opened. The product of the PAV input and the analog voltage input for a circuit means provides the multiplied current output of the output means thereof. Because of the high impedance of a FET gate means, it may be used where its gate means is the programming input of the PAVMCM means. PAVMCM means can be formed using FET multiplier and differential amplifier multiplier circuit means. The PAVMCM can be arranged to form embodiments of analog vector-vector and analog vector-matrix multiplier circuit means. One of the advantages of the PAVMCM when configured as a vector-matrix multiplier circuit means is that it is useful in an artificial neural network as well as for pattern recognition.

33 Claims, 6 Drawing Sheets

PROGRAMMABLE ANALOG VOLTAGE MULTIPLIER CIRCUIT MEANS

This invention relates to a programmable analog voltage multiplier circuit means and more particularly it relates to an improved programmable analog voltage multiplier circuit means of solid-state microstructure and integrated design including embodiments of FET multiplier, differential amplifier multiplier, vector-vector multiplier and vector-matrix multiplier arrangements thereof.

BACKGROUND OF THE INVENTION

Various types of solid-state microstructured and integrated circuits have been designed in the past. For example, U.S. Pat. No. 4,649,289 to T. Nakano concerns a repetitive integrated charging circuit for maintaining a node potential of a MOS dynamic circuit. The species of FIG. 3 is considered pertinent. The FIG. 3 circuit is generally made up of a capacitor, a transistor-capacitor arrangement and an oscillator. The capacitor is parallel connected to the node between the transistors of a MOS dynamic circuit and the transistor-capacitor arrangement. By reason of the oscillator timely charging the capacitor via the transistor-capacitor arrangement, the node potential is substantially maintained during use of the MOS dynamic circuit. U.S. Pat. No. 4,677,317 to H. Sakuma is of interest in disclosing a high voltage output signal producing circuit for one or more display elements and the like. The circuit is generally made up of at least two integrated, transistorized and capacitor interconnected signal processors of low power consumption for producing a high voltage output. U.S. Pat. No. 4,710,726 to Carucci discloses a tunable semiconductive MOS resistance network or circuit means of integrated construction and for operation in the nonsaturated or triode mode. The species of FIG. 1 is deemed pertinent. The circuit means of the FIG. 1 species is generally made up of two inputs, two outputs, two control inputs and a series of four matched MOS transistors of n-channel design. The two inputs and the two control inputs are connected to certain and different pairs of transistors of the series of four transistors so that the series of four transistors provides the desired combined transconductance output of different polarity to each output means of the circuit means. However, none of the aforediscussed references were remotely concerned with an improved programmable analog voltage multiplier circuit means (PAVMCM) to which a programmable analog voltage input is dynamically stored on a capacitor at high impedance input to a multiplier and the PAVMCM is useful in providing one or more multiplied outputs in various applications such as artificial neural networks (artificial intelligence) or pattern recognition as will now be described.

SUMMARY OF THE INVENTION

An object of the invention is to provide an improved programmable analog voltage multiplier circuit means (PAVMCM) of relatively low power consumption that is of integrated and micro-structure semi-conductance design so that it can readily be used in a wide number of applications including being operable during linear/nonlinear conditions.

Another object of the invention is to provide an improved analog voltage multiplier circuit means of microstructure and integrated design that is readily adaptable to be part of various integrated arrangements such as programmable analog voltage multiplier circuit means, programmable analog vector-vector multiplier circuit means and programmable analog vector-matrix multiplier circuit means.

Still another object of the present invention is to provide an improved analog voltage multiplier circuit having capacitor means interposed between switch means and a high impedance analog voltage (HIAV) programming input means of the circuit means where the HIAV programming input means can be the gate means of a field effect transistor means and where the capacitor means receives and dynamically stores a programmed analog voltage input of preselected value for applying the programmed analog voltage input to the programming input means of the circuit means.

Yet another object of the present invention is to provide an improved programmable voltage multiplier circuit means where the capacitor means thereof is the intrinsic capacitance of either the HIAV programming input means or the gate means of the FET means at the PAVMCM programming input thereof.

In brief summary, an improved programmable analog voltage multiplier circuit means, in one embodiment thereof, is generally made up of switch means, capacitor means and a HIAV programming input means, analog voltage input means and current source output means. The capacitor means is interposed between the switch means and the HIAV input means. Moreover, the capacitor means receives and dynamically stores a programmed analog voltage input and then applies the programmed input to its HIAV input means in response to the switch means. When the circuit means also receives an analog voltage input via its analog voltage input means, the product of these input means provides a multiplied current output to the current source output means. The HIAV programming input means can be the gate means of a FET means while the other input means is the drain thereof. Further, this circuit means with its HIAV programming input means is readily adaptable so as to provide a plurality of two or more PAVMCM that are summed together in row-like fashion so as to form a programmable analog vector-vector multiplier circuit means.

In another embodiment of the invention, a programmable double quadrant analog voltage multiplier circuit means is generally made up of two FET means of n-and p-channel design, switch means and capacitor means. The capacitor means is parallel interconnected to the gate means of both FET means and interposed between the switch means and the FET gate means. The n-and p-channel FET means are connected to current receiving means to form current source and sink outputs to the current receiving means. Analog voltage input means of different polarity are appropriately connected to nonprogramming input means of the FET means.

In still another embodiment of the invention a programmable, at least single quadrant, analog voltage multiplier circuit means is made up of a pair of FET means of the same channel design switch means and capacitor means. A reference analog voltage input is connected to the gate means of one FET means. The capacitor means is connected to the gate means of the FET means and interposed between the switch means and the gate means of the FET. A common analog voltage input is parallel interconnected to the nonprogramming input of each FET means. Current source output means of the FET means are separately connected to current differencing means. In a slight modification of this embodiment, the reference analog voltage input is also provided with switch means and capacitor means. One of the advantages of this modification is that it is a balanced design and is not subject to adverse effects in a high temperature environment. Such adverse effects can be drift in the stored analog voltage at the HIAV programming input means or the gate means of the FET means as caused by leakage currents when the PAVMCM is not a balanced design.

Another embodiment is a differential amplifier programmable double quadrant analog voltage multiplier circuit means. This circuit means is generally made up of a series of three FET means all of the same channel design, a pair of switch means and a pair of capacitor means. Two of the FET means of the series are associated with the separate pair of capacitor and switch means. A programmed analog voltage input is applied through the switch means to the gate means of the second FET means and stored in one of the capacitor means when the switch means opens. A reference analog voltage input is applied through the other switch means to input means of the third FET means and stored in the other capacitor means of the pair. A analog voltage input is applied to the gate means of the first FET means. The current source output of the first FET means is approximately proportioned to the square of the difference between gate-to-source voltage and the threshold voltage of the first FET means. Current source output means of the first FET means is parallel interconnected to the source means of the second and third FET means. The multiplied output is the difference in current values of the second and third FET means current output means. The second and third FET means current output means are connected to current differencing means.

A subthreshold differential amplifier programmable double quadrant analog voltage multiplier circuit means is also generally made up of a series of three FET means all of the same channel design, a pair of switch means and a pair of capacitor means. An analog low current input is parallel interconnected to the gate and drain means of another FET means and is further parallel interconnected to the gate means of the first FET means to form a current mirror arrangement so that the current output of the first FET means is linearly related to the analog low current input. A bias voltage is parallel connected to the source means of the other FET means and to the source means of the first FET means. The current output means of the first FET means of the series is parallel interconnected to the source means of the second and third FET means thereof and is of low value so that the second and third FET means operate in the subthreshold mode. The amplified and multiplied current output means of the second and third FET means are connected to current differencing means.

A programmable analog vector-matrix multiplier circuit means, in another embodiment of the invention, is generally made up of a series of programmable analog voltage multiplier circuit means (PAVMCM) such that two or more groups of PAVMCM of the series thereof are arranged relatively spaced from each other with each group defining a row and with two or more rows of the PAVMCM defining two or more columns so as to form a matrix of programmed analog voltages that are dynamically stored on capacitors at the HIAV input of the PAVMCM. The analog vector input is made up of a series of analog voltage inputs to the PAVMCM. Each analog voltage input of the series is applied to all the PAVMCM in a column. An analog vector output of the multiplied analog vector input and the matrix of weights with each element of the analog vector output being the summed multiplied output of each row of the PAVMCM. A programmed analog voltage input means is parallel interconnected to a series of X and Y switch means so as to allow analog voltages to be dynamically stored at the HIAV input of each PAVMCM of the series. The series of X and Y switch means are parallel interconnected to the capacitor means of each PAVMCM of the series thereof. To this end, each Y switch means of the series is connected to the capacitor means of its associated PAVMCM of the series. Each X switch means of the series is connected to the programmed analog voltage input means along a given row of the vector-matrix multiplier circuit means (VMMCM) before any Y switch means along the gives row thereof. Current source output means of a group of PAVMCM along any row of the VMMCM is connected to a current summing means. Separate analog voltage input means are provided for each column of two or more PAVMCM of the VMMCM. X and Y decoder means have output means connected to the X and Y switch means in such fashion that certain X and Y switch means are closed for selecting one or more capacitor means and associated PAVMCM so as to provide one or more multlplied current outputs during each operative cycle of VMMCM. To assist the operation of the VMMCM appropriate multiplexer means are provided for distributing the current differencing output means and the analog voltage input means. By reason of the current output means for each row of the VMMCM, it is readily adaptible for use, e.g., in an artificial neural network or for pattern recognition.

For any of the aforeaddressed embodiments metal oxide substrate FET (MOSFET) means are preferably used. Depending on the use requirements of any PAVMCM, the capacitor means can be the intrinsic capacitor means of either the HIAV programming input or the gate means of a FET means at the PAVMCM, programming inputs.

Other object and advantages of the invention will become apparent when taken in conjunction with the accompanying specification and drawings as follows:

DETAILED DESCRIPTION OF THE INVENTION

Figure 1:
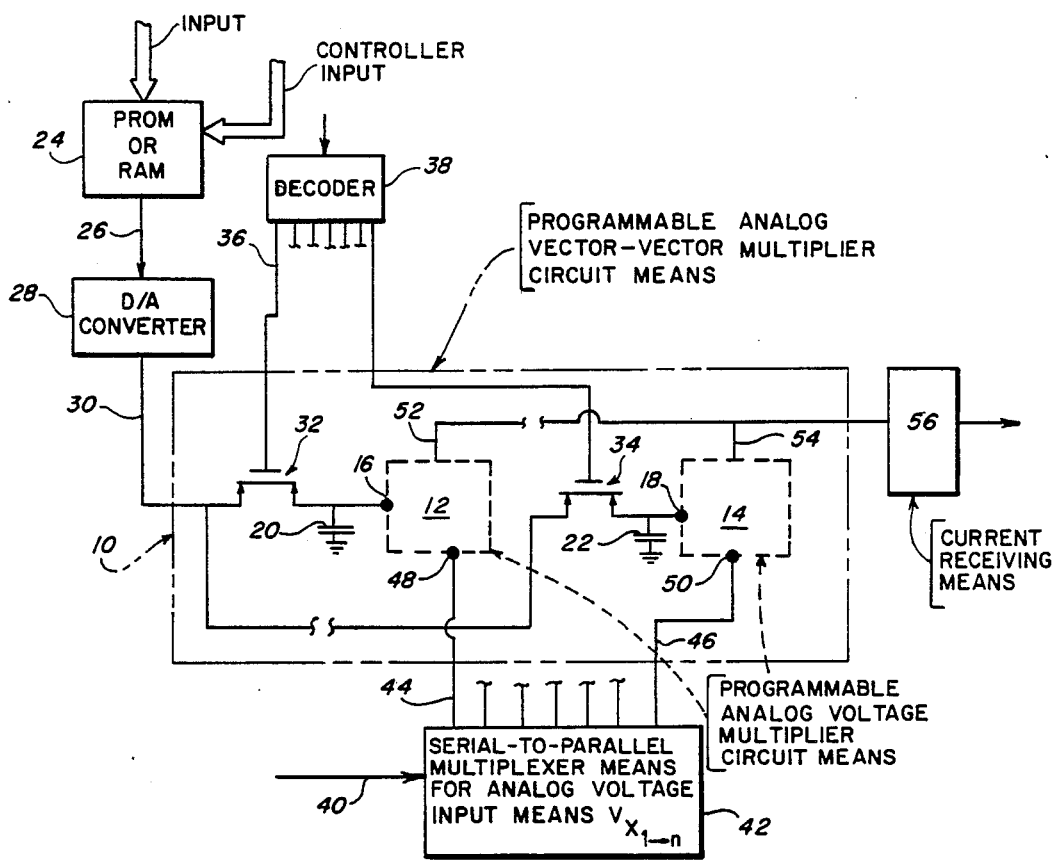
FIG. 1 is a diagrammatic view with parts broken away of an embodiment of the invention and illustrates a programmable analog vector-vector multiplier circuit means.

With further reference to FIG. 1, a programmable analog vector-vector multiplier circuit means 10 of the invention is generally made up of a plurality of two or more programmable analog voltage multiplier circuit means (PAVMCM) 12 and 14 (only two are being shown) all preferably arranged in a single row. Each PAVMCM is provided with a high impedance analog voltage (HIAV) programming input means 16 and 18. Grounded capacitors 20 and 22 are connected to HIAV programming input means 16 and 18 of the PAVMCM. A PROM or RAM 24 receives a digital input for storage as controlled by the controller input. Programmed digital word output 26 of the PROM or RAM is controlled by the controller input and is connected to digital-to-analog (D/A) converter 28. Output 30 of the D/A converter provides a programmed analog voltage (PAV) input means. A pair of switches or FET means 32 and 34 have their input means parallel connected to PAV input means 30. The output means of switches 32 and 34 are connected to capacitors 20 and 22, respectively. Separate output means 36 and 37 of a decoder 38 is connected to the gate means of switches 32 and 34. Other output means of decoder 38 including the gate means of switches associated therewith are not shown for the sake of brevity.

Analog voltage input means in serial format 40 is connected to a serial-to-parallel multiplexer 42. Each output of the series of parallel outputs of multiplexer 42 is connected to the input means of its associated PAVMCM such as outputs 44 and 46 to input means 48 and 50 of PAVMCM 12 and 14. Current output means 52 and 54 of PAVMCM 12 and 14 are parallel interconnected to current receiving means 56.

When a PAV input is provided by D/A converter 28 and switch means 32 is closed by decoder 38 providing output 36, capacitor 20 dynamically stores the PAV input of input means 30. Upon switch means 32 being opened when there is no output in output means 36 from decoder 38, capacitor 20 then applies the dynamically stored PAV input to programming input means 16 of the PAVMCM. At the same time, output means 44 of multiplexer 42 provides a sequential analog voltage input from multiplexer 42 to input means 48 of the PAVMCM. By reason of PAVMCM 12 receiving a PAV input and an analog voltage input, the product is a multiplied current source output via output means 52 to current receiving means 56. Depending on the operation of decoder means 38 and multiplexer means 42 in providing more than one PAVMCM current output for each cycle of multiplier circuit means 10 and more than one sequential output, e.g. multiplied current outputs of output means 52 and 54 are effectively summed by current receiving means 56 during each operative cycle of multiplier circuit means 10 so as to form an analog vector-vector multiplied output.

Although only two PAVMCM are shown it is to be understood that any number of PAVMCM could be provided for vector-vector multiplier circuit means 10. Since input means 40 provides a series of analog voltage input means they can be of different values. But despite these different values, the multiplied current outputs of each PAVMCM even though of different value are still effectively summed by current receiving means 56 for each cycle of the vector-vector multiplier circuit means. For some operation modes of the vector-vector multiplier, the PAV input stored in either capacitor 20 or 22 is preferably a constant fixed value for a number of operation cycles. Since the PAV input is dynamically stored on capacitor 20 or 22, the PAV value can drift due to leakage through either switch 32 or 34. The PAV can be replenished to capacitors 20 and 22 by the memory controller writing appropriate digital words to D/A converter 28 so as to maintain the desired PAV input. The PAV inputs are again stored at capacitor 20 or 22 by appropriately opening and closing switches 32 and 34 in synchronization with PAV input 30. It should be evident that if multiplier circuit means 10 is comprised of only one PAVMCM then it is merely a PAVMCM.

Figure 2:
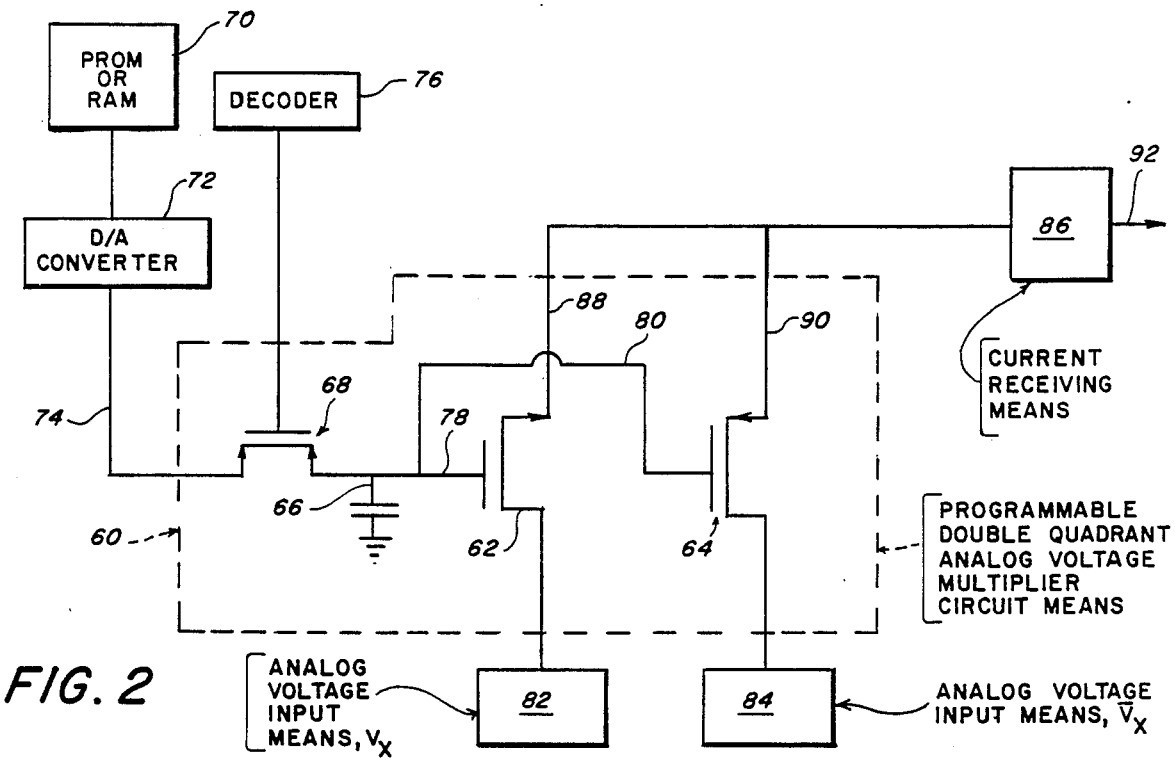
FIG. 2 is a diagrammatic view of a programmable analog voltage multiplier circuit means (PAVMCM) of the invention as another embodiment thereof.

As depicted in FIG. 2, in another embodiment of the invention, a programmable double quadrant analog voltage multiplier circuit means 60 is generally made up of n-channel FET means 62, p-channel FET means 64, a capacitor 66, and a switch 68. As in FIG. 1, a PROM or RAM 70 in conjunction with a D/A converter 72 provide a PAV input, via output means 74, to capacitor 66 for dynamic storage when switch 68 is closed by the output means of a decoder 76. Capacitor 66 is parallel interconnected by output means 78 and 80 to the gate means of FET means 62 and 64, respectively. The output means of analog voltage input means 82 and 84 of positive and negative voltage polarity relative to the voltage of current source and sink output means 88 and 90, respectively, are connected to the input means of FET means 62 and 64. Current receiving means 86 has an input parallel interconnected to current source and current sink output means 88 and 90 of FET means 62 and 64. When switch 68 is open after capacitor 66 dynamically stores a PAV input, then the capacitor simultaneously applies the stored PAV input to the gate means of FET means 62 and 64. If the PAV input is a positive polarity then current source output means 88 provides a positive current source output to receiving means 86 and its output means 92. This positive current source output is a product of the PAV input and Vx analog voltage input, if Vx has a positive polarity value for a given cycle of circuit means 60. On the other hand, if PAV input is a negative polarity, then current sink output means 90 provides a negative current sink output to receiving means 86 that is a multiplied product of the PAV and Vx (if Vx has a negative polarity value). The multiplied product will be a linear product of the PAV and Vx if FET means 62 and 64 are operated in the triode mode with the drain-to-source voltage of FET means 62 and 64 being smaller than the difference of the gate-to-source and the FET threshold voltages. The product will be non-linear if FET means 62 and 64 are operated in the saturated mode. Thus, circuit means 60 provides double quadrant multiplied current outputs via output means 92.

It should be evident that circuit means 60 would be operable if it only incorporated a single transistor of n- or p-channel, of course, current receiving means 86 by its output means 92 would then only be a single quadrant multiplied current output that is a product of the PAV and Vx analog input voltage. The product will be linear if the FEt means is operated in the triode mode and non-linear if operated in the saturated mode.

Figure 3:
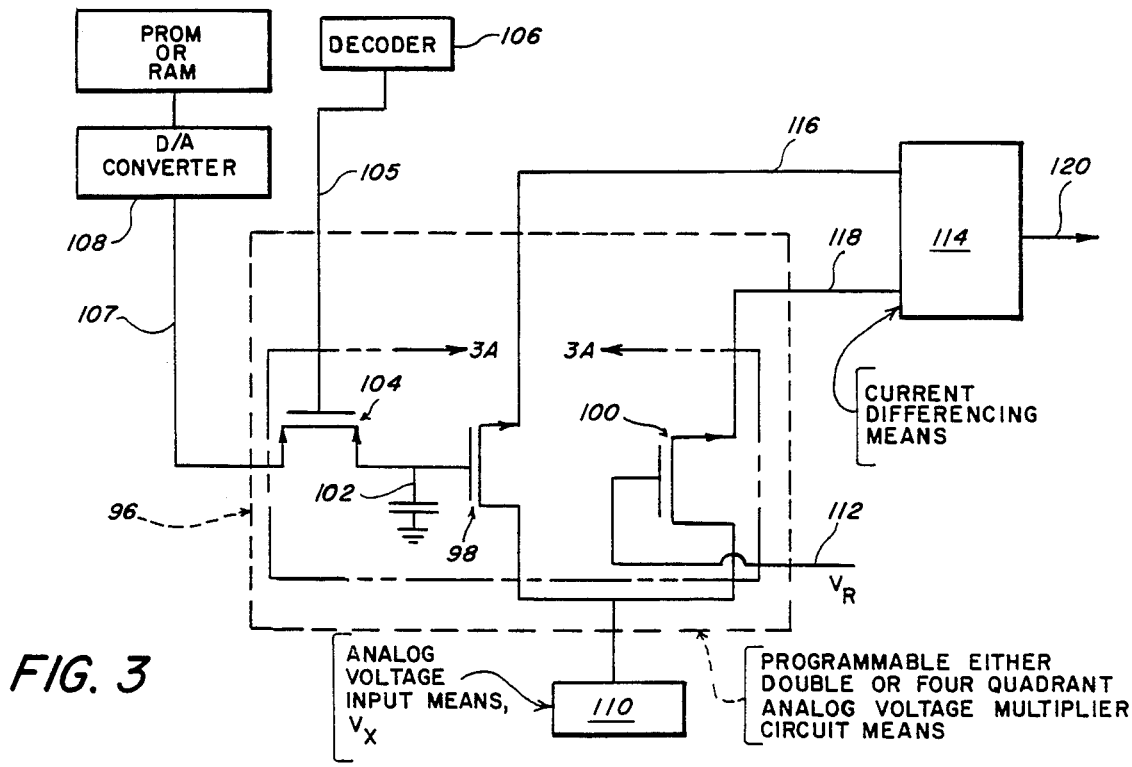
FIG. 3 is a diagrammatic view of another embodiment of the invention.

Another embodiment of the invention concerns a programmable, single, double or four quadrant analog voltage multiplier circuit means as depicted in FIG. 3. The circuit means is generally made up of a pair of n-channel FET means 98 and 100. A capacitor 102 is connected to the gate means of FET means 98. A switch 104, as controlled by output means 105 of decoder 106, is connected to capacitor 102. A PAV input of output means 107 of D/A coverter 108 is connected to switch means 104. A common analog voltage input means 110 is parallel interconnected via its output means to the input means of FET means 98 and 100. A reference analog voltage input means 112 is connected to the gate means of FET means 100. Current differencing means 114 has first and second input means 116 and 118 that are connected to the output means of FET means 98 and 100. It is noted here that generally the input impedance to the current differencing means is of low value and the voltage values of current input means 116 and 118 will change little as the input current is varied. Also, the current input means 116 and 118 have the voltage values that are close in magnitude.

In an operative embodiment of circuit means 96, PAV input of output means 107, analog voltage input means 110 and reference analog voltage input means 112 are all of positive polarity with respect to the voltage of current output means 116 and 118. With the PAV input being of greater value than reference analog voltage input means 112, then output means 120 of current differencing means 114 provides a multiplied output of positive polarity that is a product of a Vx input and the difference in voltage between a PAV input and a reference voltage input for a given cycle of circuit means 96 and that is located in the first quadrant. If the PAV input, reference voltage input and analog voltage are selected so that FET means 98 and 100 operate in the triode mode, than the current difference output will be a linear product of Vx input and the difference between a PAV input and a reference voltage input. If FET means 98 and 100 operated in the saturated mode, then the modified product will be non-linear. On the other hand, if reference analog voltage input means 112 is of greater value than the PAV input of output means 107, then current differencing means provides an output for net multiplied output 120 of negative value and in the second quadrant. Similarly, if the analog voltage input means is of negative polarity relative to the voltage of current output means 116 and 188 but reference analog voltage input means 112 is of positive polarity and lesser value than the PAV input (which is also of positive polarity), then the current differencing means 114 provides an output for multiplied output 120 of negative value and in the fourth quadrant. But, if the analog voltage input means is of negative polarity and the reference analog voltage input means is of greater value than the PAV input, the net multiplied output from output means 120 is positive and in the third quadrant.

Since capacitor 102 tends to have leakage current generated by switch 104, especially in a high temperature environment, and since switch 104 and capacitor 102 are only provided for FET means 98 of circuit means 96, the circuit means is not of balanced construction and thus is normally of limited use for high temperature operation. This imbalance results in a drift in the net multiplier output of output means 20. Where this drift is objectionable it can be minimized by frequently refreshing (replenishing) the PAV input stored on capacitor 102. Accordingly, a slight modification of circuit means 96 is provided as will now be described in FIG. 3A.

Figure 3A:
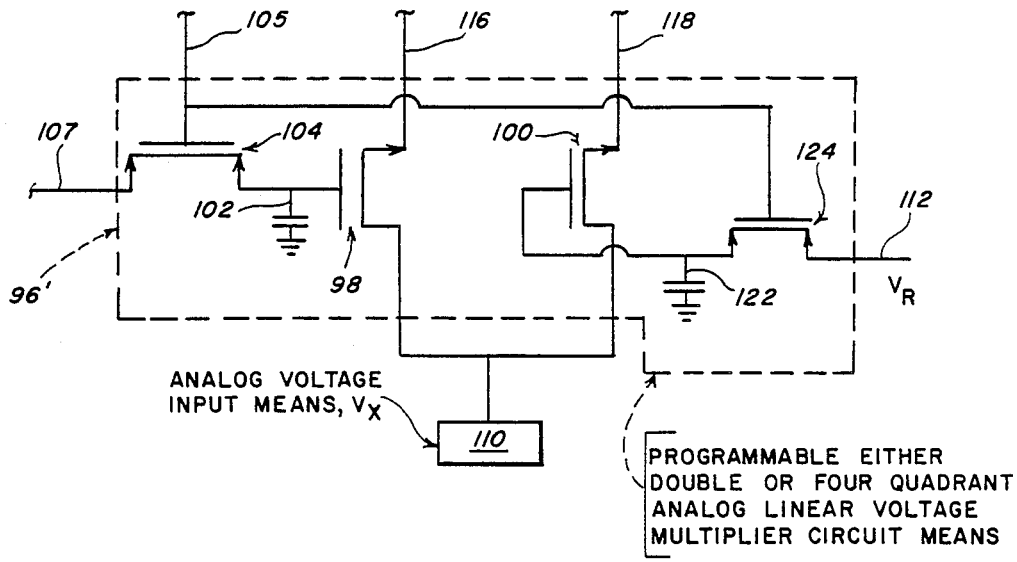
FIG. 3A is an enlarged diagrammatic view as taken within the bounds of encompassing line 3A—3A of FIG. 3 and illustrates a slight modification thereof.

For the sake of simplicity corresponding reference numerals between the embodiments of FIGS. 3 and 3A refer to like parts. In the slightly modified circuit means 96' of FIG. 3A, a capacitor 122 is connected to the gate means of FET means 100. Switch means 124 is connected to the capacitor and a reference analog voltage input means 112. Output means 105 of the decoder is parallel interconnected to the gate means of FET means 98 and 100. By reason of this balanced construction of circuit means 96; the output means of the current differencing means (not shown) provides a net multiplied output with minimized drift and in different quadrants as aforedescribed in the embodiment of FIG. 3.

Figure 4:
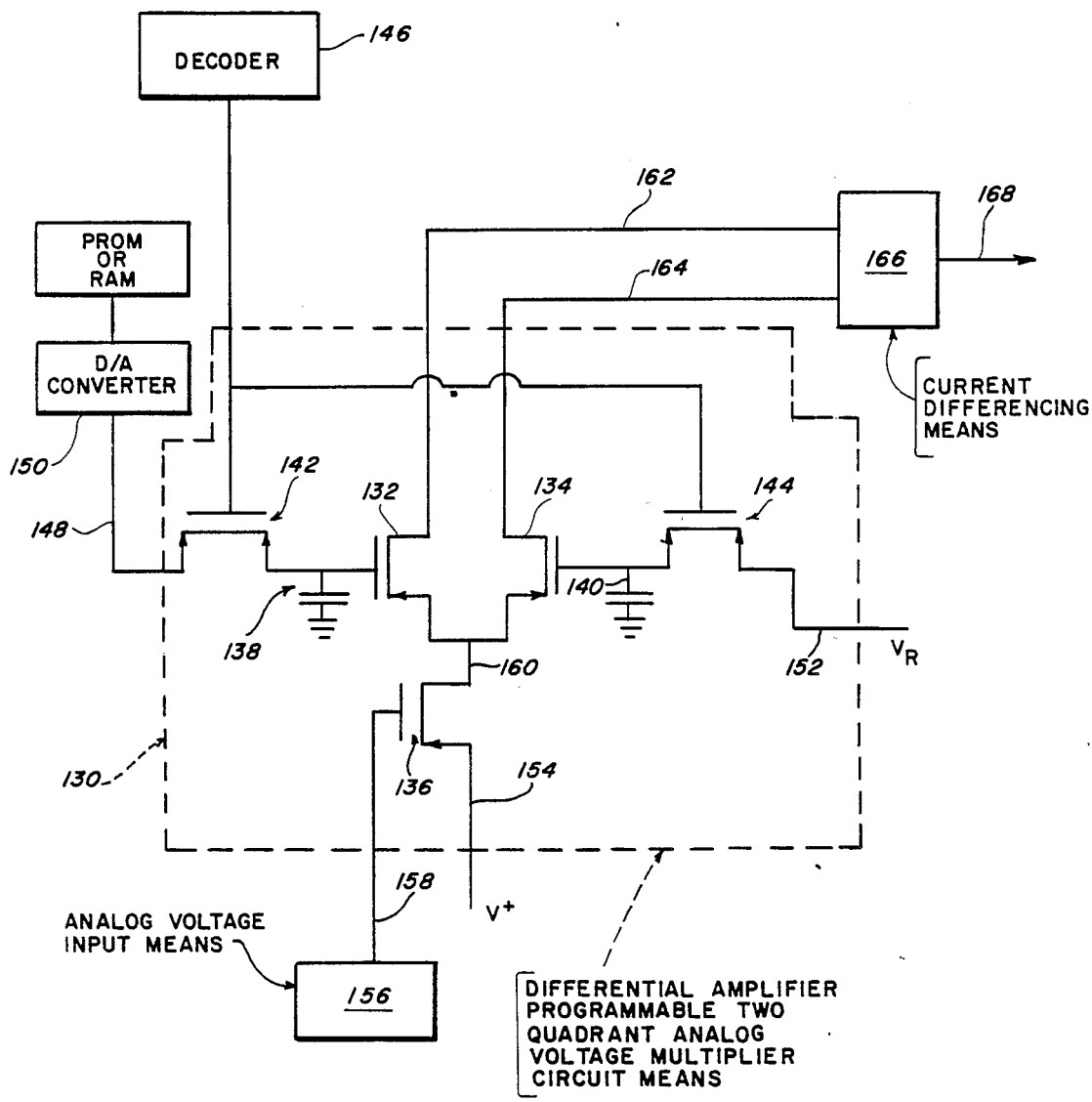
FIG. 4 is a diagrammatic view of a differential amplifier / PAVMCM of the invention.

In another embodiment of the invention, a differential amplifier programmable two quadrant analog voltage multiplier circuit means 130 is disclosed in FIG. 4. This multiplier circuit means is generally made up of a series of three FET means 132, 134 and 136, a pair of capacitor means 138 and 140 and a pair of switch means 142 and 144. The control inputs of the pair of switch means are parallel interconnected to the output of decoder means 146.

A programmable analog voltage input of preselected value as provided by output means 148 of a D/A converter 150 is connected to switch means 142. A reference analog voltage input means 152 is connected to switch means 144. A bias voltage input means 154 is connected to the source means of first FET means 136. A bias means 154 to the source means of first FET means 136 provides the gate-to-source voltage thereof when analog voltage input means 156 provides analog voltage input 158. As the result of the gate-to-source voltage of FET means 136, it provides a current source output 160 to the source means of second and third FET means 132 and 134 thereof. It is noted here that first FET means, operates in the pentode mode and its current source output means is proportional to the square of the gate-to-source voltage minus a threshold term of FET means 136 that is provided by analog voltage input means 156.

When the output means of decoder means 146 provides an output for closing both switch means 142 and 144, output means 148 provides a programmable analog voltage (PAV) input to capacitor means 138 for receiving and dynamically storing same. At the same time, reference analog voltage input means 152 with switch means 144 being closed, as the result of the output means of decoder means 146, causes capacitor means 140 to receive and dynamically store the reference analog voltage (RAV) input of input means 152. Then when the RAV and the first PAV inputs are stored by capacitor means 138 and 140, the output of the output means of decoder means 146 for closing switches 142 and 144 is terminated. As the result of switch means 142 and 144 being opened, then the dynamically stored PAV and RAV inputs are applied to the gate means of second and third FET means 132 and 134 so as to provide the gate voltage therefor.

With the second and third FET means having gate voltages as aforedescribed, amplified multiplied current outputs from the drain means of the second and third FET means to the current source output means 162 and 164 are applied to differencing means 166 so as to provide a current differenced and multiplied product output to output means 168. If a PAV input, a RAV input and an analog voltage input are all the same polarity relative to bias voltage means 154 and the RAV input is less than the PAV input, then the output of output means 168 is positive and in the first quadrant for each operative cycle of the amplifier/multiplier circuit means. Moreover, the output of output means 168 is proportional to the product of the difference between the PAV and RAV voltages and the difference between the gate-to-source voltage of FET means 136 as supplied by analog input means 156 and a threshold voltage term intrinsic to FET means 136. On the other hand, if the RAV input is greater than the PAV input and the same polarity, then the output of output means 168 is negative and in the second quadrant as the result of the action of differencing means 166.

Figure 5:
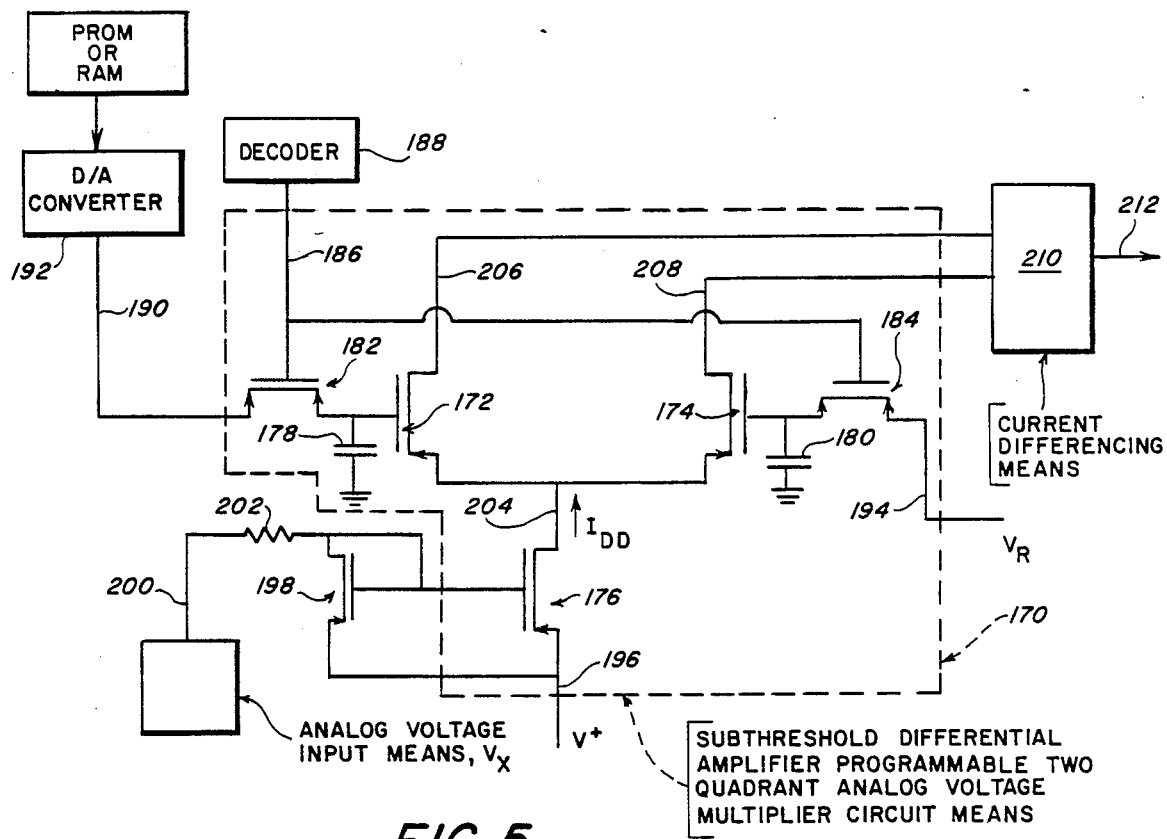
FIG. 5 is a diagrammatic view of a subthreshold differential amplifier PAVMCM of the invention.

As depicted in FIG. 5, another embodiment is a sub-threshold differential amplifier programmable two quadrant analog voltage multiplier circuit means 170. The subthreshold amplifer/multiplier circuit means is generally comprised of a series of three FET means 172, 174, 176, a pair of capacitor means 178 and 180 and a pair of switch means 182 and 184. Output means 186 of decoder means 188 is parallel interconnected to both switch means 182 and 184. Output means 190 of D/A converter 192 provides a programmable analog voltage (PAV) input of preselected value to switch means 182. A reference analog voltage (RAV) input means 194 is connected to switch means 184. A bias voltage input means 196 is parallel interconnected to the source means of first FET means 176 so as to provide a gate-to-source voltage therefor and to the source means of another FET means 198. Output means 200 of analog voltage input means includes a resistor 202, the current output means of which is parallel interconnected to the drain means and the gate means of FET means 198 so as to provide the gate voltage and drain-to-source voltage therfor. The current output means of resistor 202 is also interconnected to the gate means of first FET means 176 so as to provide the gate voltage thereof. It is noted here as the result of the relation between FET means 198 and 176 and the way they are configured in relation to each other, current output means 204 is linearly related and the mirror image of the current output of resistor 202. Therefore, current source output 204 of FET 176 is linearly related to the drain current of FET 198 and to the analog voltage input 200. Current source output means 204 of first FET means 176 is parallel interconnected to the source means of second and third FET means 172 and 174. It is noted that the current source output 204 is of low value so that the second and third FET means 172 and 174 are in subthreshold operation. Amplified/multiplied current source output means 206 and 208 are connected to separate input means of current differencing means 210. The current differencing means is provided with output means 212.

In an operative embodiment of the amplifier/multiplier circuit means of FIG. 5, analog voltage input 200 applied to resistor 202 results in a current source output of the resistor means 202 to the gate means of the first FET means 176 and to the drain means and the gate means of FET means 198 so as to cause a current source output of output means 204 to the source means of second and third FET means 172 and 174. With capacitor means 178 providing a stored PAV input to the gate means of second FET means 172 after switch means 182 is opened as the result of the action of the output means of decoder means 188, capacitor 180 provides a dynamically stored RAV input to the gate means of third FET means 174 so as to provide the gate voltage therefor. The current source output of output means 204 in being linearly related to the analog voltage input 200, a current difference of current output means 206 and 208 is formed and inputed to current differencing means 210. The output 212 of current differencing means 210 will be a product of the difference between the stored RAV and PAV and the difference between the analog voltage input and a fixed term. The fixed term is the difference between analog voltage 200 and the drain node voltage of FET 198 as divided by the resistance of resistor 202 so as to provide a current source. It should noted that resistor 202 could be replaced by a voltage to current generation circuit. With the PAV input, analog voltage input and RAV input all of positive polarity and with the RAV input being less than the PAV input, then output means 212 of the current differencing means is positive and in the first quadrant. However, if the RAV input is greater than the PAV input then the output of output means 212 is negative and in the second quadrant.

Figure 6:
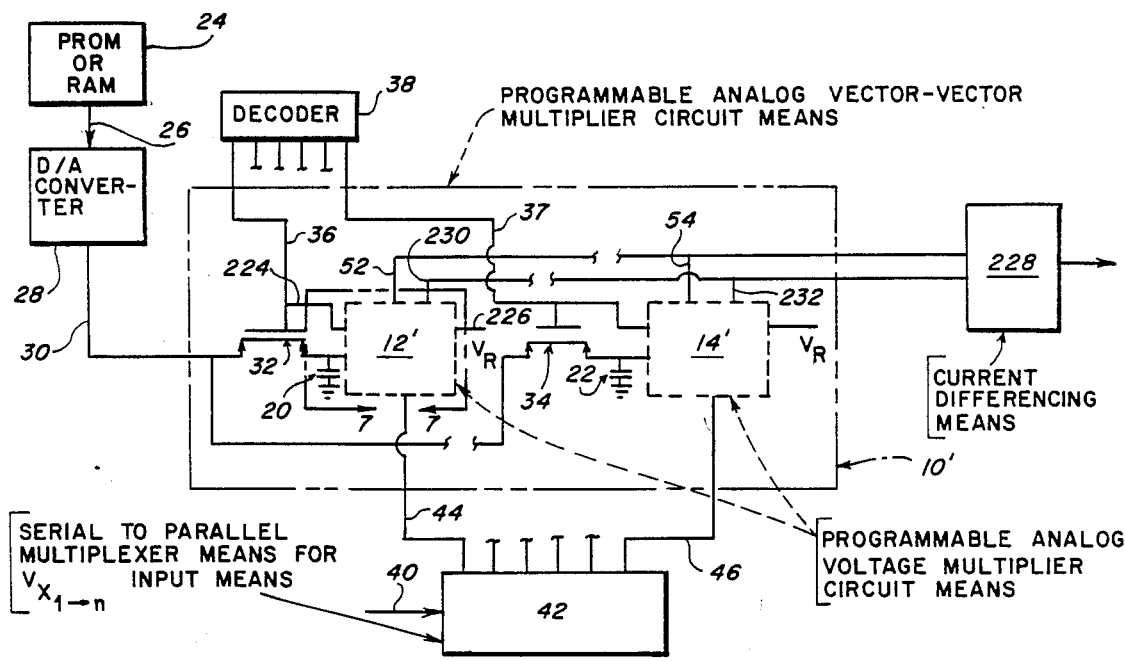
FIG. 6 is a diagrammatic view with parts broken away of another embodiment of a programmable analog vector-vector multiplier circuit means of the invention and similar to the embodiment of FIG. 1.

A slight modification of the programmable analog vector-vector multiplier circuit means 10 of FIG. 1 is shown in FIG. 6. For the sake of brevity corresponding parts of FIGS. 1 and 6 are reference numbered the same. However, each PAVMCM of multiplier circuit means 10' of FIG. 6 is configured differently than each PAVMCM of circuit means 10 of FIG. 1.

Figure 7:
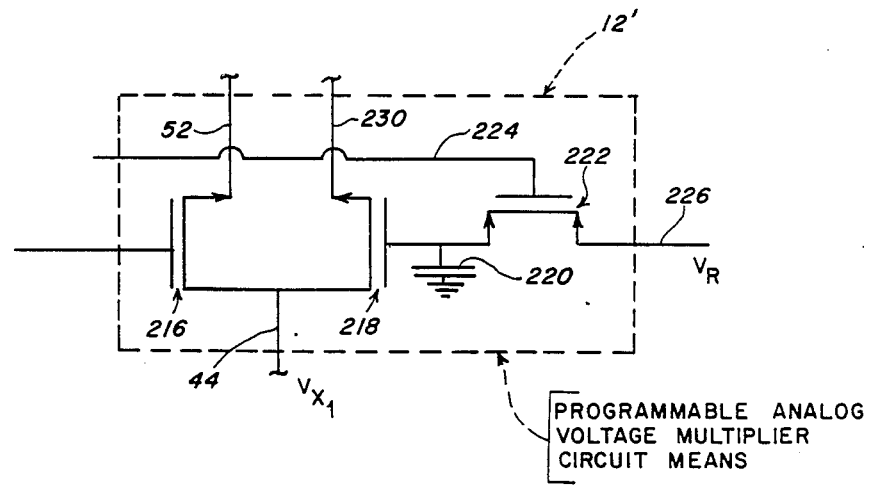
FIG. 7 is an enlarged diagrammatic view taken within the bounds of encompassing line 7—7 of FIG. 6 and illustrates further details of the invention.

To this end, reference is made to FIG. 7, PAVMCM 12 is generally made up of a pair of FET means 216 and 218, second capacitor means 220 and second switch means 222. Capacitor means 220 in being connected to switch means 222 is also connected to the gate means of FET means 218. Output means 36 of decoder means 38 is provided with branch output means 224 for parallel interconnecting the decoder output means to switch means 222. A reference analog voltage input means 226 is connected to switch means 222. Output means 44 of multiplexer 42 is parallel interconnected to the input means of both FET means 216 and 218. Multiplied current source output means 52 of FET means 216 is connected to an input of current differencing means 228. Multiplied current source output means 230 of FET means 218 is connected to another input of the current differencing means as best shown in FIG. 7.

All PAVMCM of circuit means 10' in FIG. 6 are configured in similar fashion as PAVMCM 12'. Moreover PAVMCM 14', as generally shown in FIG. 6, is provided with multiplied current source output means 54 of one FET means (not shown) being parallel interconnected to output means 52 of PAVMCM 12' and differencing means 228. Multiplied current source output means 232 of the second FET means (not shown) of PAVMCM 14' is parallel interconnected to multiplied current source output means 230 of PAVMCM 12' and differencing means 228. Another output means 46 of multiplexer 42 is parallel interconnected to the input means of both FET means (not shown) of PAVMCM 14' and provides an analog voltage input thereto in response to input means 40 during use of multiplier circuit means 10'.

In an operative embodiment of circuit means 10' of FIG. 6 it is evident that each PAVMCM 12', 14', etc., of the series provides two separate multiplied current source outputs, e.g., the multiplied outputs of output means 52 and 230 of FET means 216 and 218 whenever output means 36 of decoder means 38 causes a PAV input of selected value and a RAV input to the gate means of FET means 216 and 218 respectively while at the same time output means 44 provides an analog voltage input to the input means of both FET means 216 and 218. By reason of decoder means 38 having output means for each PAVMCM 12', 14', etc., of circuit means 10' and by reason of multiplexer means 42 having output means for each PAVMCM 12', 14', etc. the two input means of differencing means 228 will have the multiplied and summed-current outputs of at least two PAVMCM for each cycle of the circuit means when at least two PAVMCM are actuated by the output means of both decoder means 38 and multiplexer means 42. If the multiplied current output of output means 230, 232, etc. of one or more PAVMCM 12', 14', etc. is less than the multiplied current source output of output means 52, 54, etc. thereof, then the output means of differencing means 228 will be in the positive quadrant for each cycle of the circuit means. The next cycle of circuit means 10' may involve a new set of analog voltage inputs of different values being established as inputs to PAVMCM 12', 14', etc. or may involve one or more PAV inputs being different values than before to PAVMCM 12', 14', etc. or any combination thereof. Thus, the circuit means is very flexible and is capable of providing a variety of different outputs.

Figure 8:
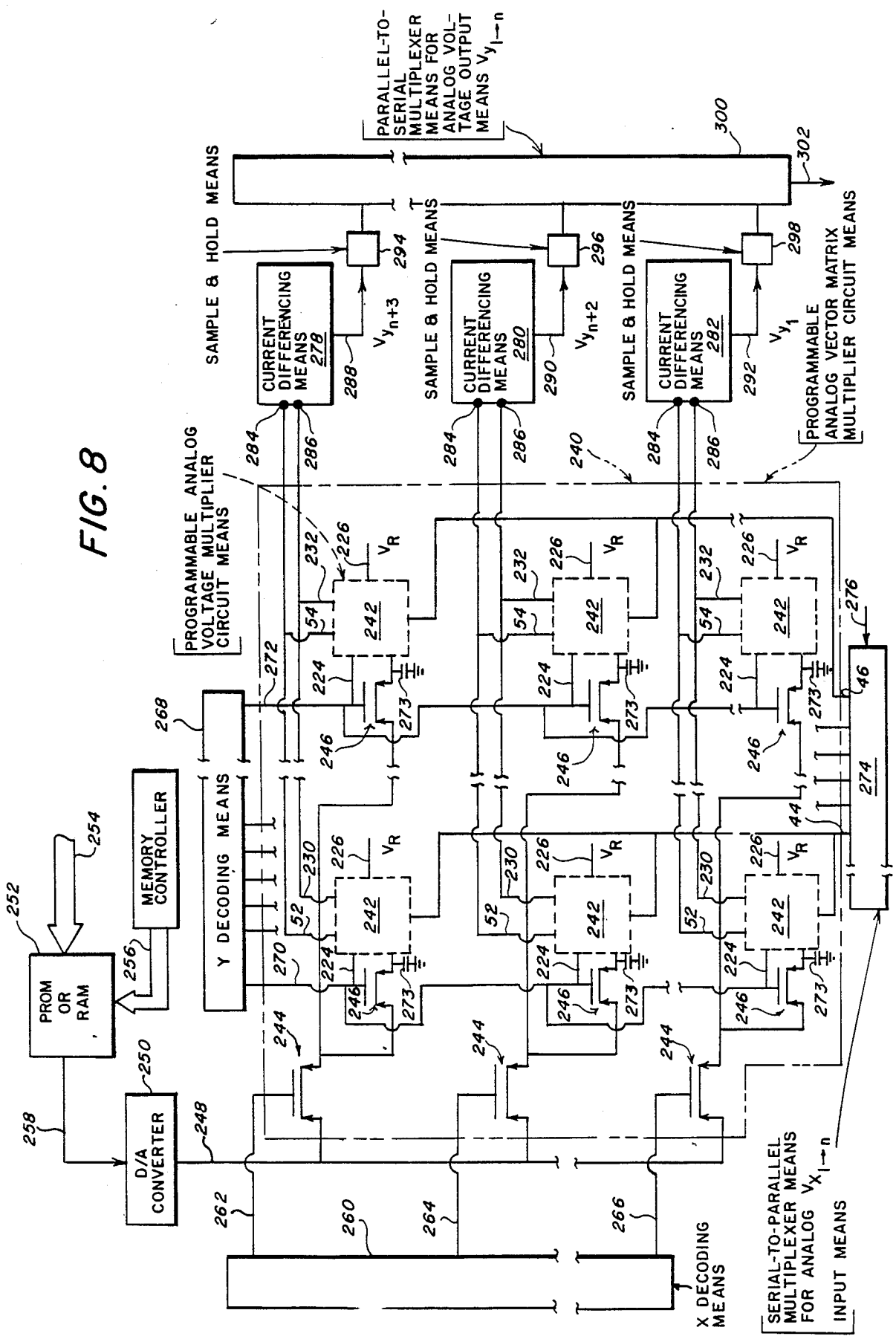
FIG. 8 is a diagrammatic view with parts broken away of a programmable analog vector-matrix multiplier circuit means.

A programmable analog vector-matrix multiplier circuit means 240 is depicted in FIG. 8. The circuit means is generally made up of a series of PAVMCM 242. The series of PAVMCM 242 are arranged in two or more groups with at least one PAVMCM in each group in spaced relation to the other PAVMCM of the series such that each group of the series defines a row while the PAVMCM of two or more rows of the series are also arranged in one or more columns so that the row-column relation of the series of PAVMCM of circuit means 240 results in the general arrangement of a matrix therefor.

A series of X switch means 244 and a series of Y switch means 246 are provided for circuit means 240. As is evident in FIG. 8, one X switch means of the series is associated with each row of PAVMCM of circuit means 240. Each X switch. means is arranged before any Y switch means of a given row of circuit means 240 and before any column thereof. Further, each Y switch means of the series of Y switch means is operatively associated with each PAVMCM 242 of the series such that separate pluralities of the series of Y switch means are arranged in separate columns where the separate columns of Y switch means 246 correspond to the plurality of columns of PAVMCM 242 of circuit means 240.

Output means 248 of D/A converter 250 is parallel interconnected to all X and Y switch means 244 and 246 of both series thereof. As in prior species of this invention PROM or RAM means 252 receives a digital input 254 and as result of a controller input 256 provides a digital output 258 during one or more programming cycles of circuit means 240. As the result of the action of D/A converter 250 in receiving digital output 258 for each cycle of the circuit means it provides a PAV input of selected value.

X decoding means 260 is provided with a series of output means corresponding to the groups of the PAVMCM in row-like fashion such as output means 262, 264 and 266. These output means 262, 264 and 266 are connected to the control input of their associated X switch means 244.

Y decoding means 268 are provided with a series of output means corresponding to the plurality of the PAVMCM in column-like fashion of circuit means 240 such as output means 270 and 272. These output means are interconnected to the control inputs of a plurality of Y switch means 246 of the first and last columns of the PAVMCM of circuit means 240 as depicted in FIG. 8.

Each PAVMCM 242 of circuit means 240 is preferably configured the same as the PAVMCM aforedescribed in FIG. 7. However, other PAVMCM embodiments as described in FIG. 2, FIG. 3, FIG. 4, FIG. 5, are also suitable for the PAVMCM 242 of circuit means 240. It is noted here that capacitor means 273 is provided with each PAVMCM 242 of circuit means 240 and is connected to the output means of its associated Y switch means 246 and the gate means of FET means 216. Decoder output means 270 at each PAVMCM 242 of the first column of the PAVMCM is provided with branch output means 224 parallel interconnected to the control input of switch means 222 (see FIG. 7). Thus, the Y switch means of each PAVMCM of circuit means 240 preferably also includes switch means 222. Similarly, a reference analog voltage (RAV) input means 226 of each PAVMCM 242 provides a RAV input to switch means 222 thereof.

It is evident that each PAVMCM 242 of circuit means 240 is configured in the same fashion (including the PAVMCM of the last column thereof) as for each PAVMCM of the first column thereof as just described.

By reason of the series of output means of X decoding means 260 such as output means 262, 264 and 266 and by reason of the series of output means of Y decoding means 268 such as output means 270 and 272, it should be evident during use of circuit means 240 that X and Y decoding means 260 and 268 could provide PAV to the HIAV input of any PAVMCM 242 in random fashion for any operative cycle of circuit means 240, e.g. output in X decoding output means 264 and output in Y decoding output means 272. When this occurs, PAVMCM of the second row of circuit means 240 and of the last column thereof as illustrated in FIG. 8 is selected for receiving a PAV from D/A converter 250. If more than one X decoding output means is provided with output during a given cycle of circuit means 240 then two or more PAVMCM are selected along the last column of the circuit means. Thus, X and Y decoding means 260 and 268 in conjunction with X and Y switching means 244 and 246 and 222 of the series thereof coordinate the selection of one or more PAVMCM 242 for programming during any cycle of the circuit means. It is further noted that the operation of the X and Y decoding means is synchronized with output means 248 of converter 250 so that a PAV input from the converter is timely and properly applied to the capacitor means of one or more PAVMCM.

A serial-to-parallel multiplexer means 274 receives via its input means 276 a series of analog voltage inputs of preselected values in serial format where these series of inputs are elements of a vector. The multiplexer means is provided with a series of output means corresponding to the number of columns in the matrix of the circuit means. For example, output means 44 is parallel interconnected to the input means of both FET means 216 and 218 (FIG. 7) of each PAVMCM 242 that makes up the front or first column of the circuit means. In similar fashion, e.g. output means 46 of the multiplexer means is parallel interconnected to the input means of both FET means (not shown) of each PAVMCM in the last column of the circuit means as illustrated in FIG. 8. Thus, each output means 44, 46, etc., of multiplexer means 274 provides an analog voltage input of preselected value to its associated column of the matrix for one or more operative cycles of circuit means 240.

A series of current differencing means are operatively associated with circuit means 240. A current differencing means is preferably provided for each row of the circuit means such as the series of three current differencing means 278, 280, and 282. Output means 52 and 230 of the PAVMCM in each row and the first column of the circuit means are connected to separate inputs 284 and 286 respectively of current differencing means 278, 280 or 282. In similar fashion, output means 54 and 232 of the PAVMCM in each row and the last column of the circuit means are parallel interconnected to output means 52 and 230 of the PAVMCM in its associated row to the output means of any other PAVMCM therein (not shown) and to inputs 284 and 286 respectively of differencing means 278, 280 or 282. Thus, both output means of a group of PAVMCM in any row of the circuit means are parallel interconnected to inputs 284 and 286 of a given differencing means 278, 280 or 282.

Each differencing means 278, 280 and 282 provides an analog voltage output $V_{yn}$ via output means 288, 290 and 292 to sample and hold S/H means 294, 296 and 298 and then to parallel-to-serial multiplexer means 300 having output means 302. This output means 302 as the result of circuit means 240 provides a series of one or more analog voltage outputs for each operative cycle of the circuit means.

In an operative embodiment of the circuit means of FIG. 8, PAV output means 248 preferably provides a series of PAV inputs of preselected and different values to each PAVMCM of circuit mean 240 with the series of PAV inputs being stored at capacitors 273 at the inputs to the PAVMCM by the action of the X and Y decoding means, such as in the manner aforedescribed.

In short, the X and Y decoding means function to selectively operate switch means 244, 246 and 222 along any row or column of the circuit means in any desired fashion. Whenever Y switch means 246 and 222 of any PAVMCM are closed and opened as the result of the action of the Y decoding means and a PAV is applied to a particular row through switch 244 as a result of the action of the X decoding circuitry, a PAV is stored on capacitor means 273 and 220 of a given PAVMCM 242 and a dynamically stored PAV input is made to the input means of both FET means 216 and 218 of the given PAVMCM.

After all of the PAV values have been stored on capacitor means 273 and 220 of all PAVMCM in circuit means 240, output means, e.g. 44, 46 of multiplexer means 274 provides a series of analog voltage inputs of preferably different values for each PAVMCM in each column of the circuit means to the input means of both FET means 216 and 218 of a given PAVMCM. Then output means 52 and 230 provide multiplied current source outputs to its associated differencing means 278, 280 or 282. The differencing means 278, 280 or 282 associated with a given row takes the difference of these combined outputs of more than one PAVMCM along the given row. The differenced output of the output means of any differencing means 278, 280 or 282 is then held by its S/H means 294, 296 or 298 at the end of any operative cycle of the circuit means so that another operative cycle of the circuit means may begin with minimal time delay while new analog voltage inputs 44, 46, etc. are provided by multiplexer 274. The analog voltage outputs of all S/H means 294, 296, 298 for each cycle of the circuit means are placed in serial format by the analog voltage output of multiplexer output means 302.

The next cycle of the circuit means programmable vector-matrix means 240 may involve a new set of analog voltage inputs of different values being established as inputs to PAVMCM 242 or may involve one or more analog voltage inputs being different values than before to PAVMCM 242 or any combination thereof. Thus, the circuit means is very flexible and is capable of providing a variety of different outputs.

Obviously, many modifications and variations of the present invention are possible in light of the above teachings. It is therefore to be understood that, within the scope of the appended claims, the invention may be practiced otherwise than as specifically described.

What is claimed and desired to be secured by letters patent of the United States is:

1. A programmable analog voltage multiplier circuit means providing a current output that is a product of analog voltage inputs, said multiplier circuit means comprising:
   programmable analog voltage multiplier circuit means |PAVMCM| having high impedance analog voltage |HIAV| programming input means, analog voltage input means and current source output means,
   programming analog voltage means having at least one programmed analog voltage input of predetermined value for the HIAV programming input means,
   capacitor means and switch means, the capacitor means for dynamically storing a programmed analog voltage input of predetermined value when the switch means is closed and for applying a dynamically stored programmed analog voltage input to the HIAV input means of the PAVMCM when the switch means is opened,
   the switch means being connected to the programming analog voltage means and the capacitor means,
   the capacitor means being connected to the HIAV programming input means of the PAVMCM,
   external analog voltage input means being connected to the analog voltage input means of the PAVMCM, the external analog voltage input means providing an analog voltage input of preselected value for the analog voltage input means of the PAVMCM, and
   the current source output means of the PAVMCM providing an analog multiplied current output that is the product of the programmed analog voltage input of the HIAV programming input means of the PAVMCM and the analog voltage input of the external analog voltage input means during use of the PAVMCM.

2. A multiplier circuit means as set forth in claim 1 wherein the PAVMCM is comprised of field effect transistor (FET) means, wherein the FET means is provided with gate means, input means and current output means; wherein the gate means is connected to the HIAV programming input means, so as to provide a gate voltage for the FET means; wherein the input means is connected to the analog voltage input means so as to provide a drain-to-source voltage therefor; and wherein the current output means is connected to the current source output means and provides a multiplied current output when the gate voltage and the drain to source voltage of the FET means activated.

3. A multiplier circuit means as set forth in claim 2 wherein the FET means is metal oxide substrate FET means.

4. A multiplier circuit means as set forth in claim 1 wherein the switch means is FET means.

5. A programmable analog voltage multiplier circuit means providing current output that is a product of analog voltage inputs, said multiplier circuit means comprising:

field effect transistor |FET| means, the FET means having gate means, input means and current output means, analog voltage means having at least one programmed analog voltage input of a preselected value for the gate means of the FET means so as to provide the gate voltage therefor, capacitor means and switch means, the capacitor means for dynamically storing a programmed analog voltage input when the switch means is closed and for applying a dynamically stored analog voltage input to the gate means when the switch means is opened, the switch means being connected to the analog voltage means and the capacitor means, the capacitor means being connected to the gate means of the FET means, analog voltage input means being connected to the input means, the analog voltage input means providing an analog voltage input of preselected value so as to provide a drain-to-source voltage for the FET means, and the output means of the FET means providing an analog multiplied current output that is the product of the gate voltage and the drain-to-source voltage of the FET means.

6. A multiplier circuit means as set forth in claim 5 wherein the gate means of the FET means includes intrinsic capacitor means and wherein the capacitor means is the intrinsic capacitor means.

7. A mutiplier circuit means as set forth in claim 5 wherein the FET means is of p-channel design.

8. A multiplier circuit means as set forth in claim 5 wherein the FET means is of n-channel design.

9. A multiplier circuit means as set forth in claim 5 wherein the gate voltage is greater than the drain-to-source voltage.

10. A multiplier circuit means as set forth in claim 5 wherein the gate voltage is less than the drain-to-source voltage and where the circuit means is operable in the nonlinear mode.

11. A multiplier circuit means as set forth in claim 5 wherein the switch means is FET means.

12. A multiplier circuit means as set forth in claim 5 wherein the FET means is metal oxide substrate FET means.

13. A multiplier circuit means as set forth in claim 5 wherein the switch means, capacitor means and FET means are of integrated construction.

14. A multiplier circuit means as set forth in claim 5 wherein the analog voltage means is comprised of digital memory storage means and digital-to-analog converter means connected to the output of the memory storage means.

15. A programmable analog voltage multiplier circuit means providing double quadrant analog multiplied current outputs that is the product of analog voltage inputs, said multiplier circuit means comprising:

n-channel and p-channel field effect transistor |FET| means, the n-channel FET means having gate means, input means, and current source output means, the p-channel FET means having gate means, input means and current sink output means, current receiving means being connected to both the current sink output means of the p-channel FET means and the current source output means of the n-channel FET means so as to provide separate multiplied current sink and source outputs during use of the multiplied circuit means, analog voltage means having at least one programmed analog voltage input of a preselected value for the gate means of the n and p-channel FET means where a programmed analog voltage input of both the n and p-channel FET means provides the gate voltage therefor, capacitor means and switch means, the capacitor means for dynamically storing a programmed analog voltage input when the switch means is closed and for applying a dynamically stored analog voltage input to the gate means of the n and p-channel FET means when the switch means is opened, the switch means being connected to the analog voltage means and the capacitor means, the capacitor means being parallel connected to the gate means of the n and p-channel FET means, first analog voltage input means of preselected value being connected to the input means of the n-channel FET means and providing positive polarity analog voltage input to the input means of the n-channel FET means so as to provide the positive polarity drain-to-source voltage therefor, second analog voltage input means of preselected value being also connected to the input means of the p-channel FET means and providing negative polarity analog voltage input to the input means of the p-channel FET means so as to provide the negative polarity drain-to-source voltage therefor, and the output means of the n-channel FET means providing an analog current sink output that is the product of the gate voltage and the drain-to-source voltage of the n-channel FET means when the gate voltage is the same polarity as the first analog voltage input means; and the output means of the p-channel FET means providing a current source output that is the product of the gate voltage and the drain-to-source voltage of the p-channel FET means when the gate voltage is the same polarity as the second analog voltage input means.

16. A multiplier circuit means as set forth in claim 15 wherein the gate means of the p-channel FET means includes intrinsic capacitor means, and wherein the capacitor means is the intrinsic capacitor means.

17. A multiplier circuit means as set forth in claim 15 wherein the gate means of the n-channel FET means includes intrinsic capacitor means, and wherein the capacitor means is the intrinsic capacitor means.

18. A programmable analog voltage multiplier circuit means providing multiplied analog current outputs that is the product of analog voltage inputs, said multiplier circuit means comprising:

first and second n-channel field effect transistor |FET| means, each FET means having current source output means, gate means and input means, analog voltage input means having at least one programmed analog voltage input of a preselected value, the analog voltage input means being connected to the gate means of the first FET means and providing a programmed analog voltage input to the gate means thereof so as to generate a gate voltage in the first FET means, capacitor means and switch means, the switch means being connected to the analog voltage input means and the capacitor means, the capacitor means being connected to the gate means of the first FET means, the capacitor means for receiving and dynamically storing each programmed analog voltage input of preselected value when the switch means is closed and for applying the dynamically stored programmed analog voltage input to the gate means of the first FET means when the switch means is opened so as to generate a gate voltage therein, reference analog voltage input means connected to the gate means of the second FET means, a reference analog voltage input to the gate means of the second FET means generating the gate voltage therein, common analog voltage input means parallel connected to the input means of the first and second FET means, the common analog voltage input means providing a common analog voltage input to the input means of the first and second FET means so as to provide a drain-to-source voltage between the input and output means of each FET means, and current differencing means connected to the output means of the first and second FET means and providing a differenced output of the output means thereof upon the output means of the first FET means providing a multiplied current source output as the product of the gate voltage and the drain-to-source voltage of the first FET means when a programmed analog voltage input and a common analog voltage input is provided by the analog and common analog voltage input means while at the same time the output means of the second FET means providing a multiplied current source output as the product of the gate voltage and the drain-to-source voltage of the second FET means when a reference analog voltage input and a common analog voltage input means is provided by the referenced analog voltage input means and the common analog voltage input means.

19. A multiplier circuit means as set forth in claim 18 wherein the switch means, the capacitor means and first and second FET means are of integrated construction.

20. A multiplier circuit means as set forth in claim 18 wherein the first and second FET means are of p-channel design.

21. A multiplier circuit means as set forth in claim 18 wherein the gate means of the first FET means includes intrinsic capacitor means, and wherein the capacitor means is the intrinsic capacitor means.

22. A multiplier circuit means as set forth in claim 18 wherein the reference analog voltage input means is provided with second capacitor means and second switch means.

23. A multiplier circuit means as set forth in claim 22 wherein the gate means of the second FET means includes intrinsic capacitor means and wherein the second capacitor means is the intrinsic capacitor means of the gate means of the second FET means.

24. A multiplier circuit means as set forth in claim 23 wherein the gate means of the first FET means includes intrinsic capacitor means and wherein the first capacitor means is the intrinsic capacitor means of the gate means of the first FET means thereof.

25. An amplifier programmable analog voltage multiplier circuit means providing at least one quadrant amplified multiplied current output, the amplifier multiplier circuit means comprising:

a plurality of three n-channel field effect transistor |FET| means, each FET means having source means, gate means and drain means, the first FET means having a threshold voltage, first and second capacitor means and first and second switch means, first analog voltage input means having a programmed analog voltage input of preselected value, reference analog input means for receiving a reference analog voltage input, second analog voltage input means having a second analog voltage input connected to the gate means of the first FET means, so as to provide the gate-to-source voltage, therefor, bias voltage input means connected to the source means of the first FET means and providing the source voltage therfor, the first switch means being connected to the first analog voltage input means and the first capacitor means, the first capacitor means being connected to the gate means of the second FET means of the plurality, the first capacitor means for receiving and dynamically storing a programmed analog voltage input from the first analog voltage input means when the first switch means is closed and for applying the dynamically stored programmed analog voltage input to the gate means of the second FET means so as to provide the gate voltage for the gate means thereof when the first switch means is opened, the second switch means being connected to the reference analog voltage input means and the second capacitor means, the second capacitor means being connected to the gate means of the third FET means of the plurality, the second capacitor means for receiving and dynamically storing a reference analog voltage input of the reference analog voltage input means when the second switch means is closed and for applying the dynamically stored reference analog voltage input to the gate means of the third FET means so as to provide the gate voltage for the gate means thereof when the second switch means is opened, drain means of the first FET means being parallel connected to the source means of the second and third FET means and providing a current source output that is approximately proportional to the square of the gate-to-source voltage of the first FET means to the source means of both the second and third FET means that results in current source outputs from the drain means of the second and third FET means, and current differencing means having first and second input means and output means, the first and second input means being connected to the drain means of the second and third FET means, the drain means of the second and third FET means providing current source outputs to the first and second input means of the current differencing means, the output means providing an amplified/multiplied current source output as the result of the product of the difference between the programmed analog voltage and the reference voltage and the difference between the analog voltage input and the threshold voltage of the first FET means when programmed analog voltage input is applied to the gate means of the second FET means, when a reference analog voltage input is applied to the gate means of the third FET means and when the drain means of the first FET means provides a current source output to the source means of the second and third FET means.

26. A subthreshold differential amplifier programmable analog voltage multiplier circuit means providing at least one quadrant multiplied output with the multiplied output being represented by the difference between two current source outputs, the multiplier circuit means comprising:

a plurality of three field effect transistor |FET| means, each FET means having gate means, source means and drain means, first programming analog voltage input means having a programmed analog voltage input of preselected value, reference analog voltage input means having an analog voltage input, bias voltage means, first and second capacitor means and first and second switch means, the first switch means being connected to the first programming analog voltage input means and the first capacitor means, the second switch means being connected to the reference analog voltage input means and the second capacitor means, the first capacitor means being connected to the gate means of the second FET means, the first capacitor means for receiving and dynamically storing a programmed analog voltage input when the first switch means is closed and for applying the dynamically stored programmed analog voltage input to the gate means of the second FET means so as to provide the gate voltage therefor when the first switch means is opened, the second capacitor means being connected to the gate means of the third FET means, the second capacitor means for receiving and dynamically storing a reference analog voltage input when the second switch means is closed and for applying the dynamically stored reference analog voltage input to the gate means of the third FET means so as to provide the gate voltage therefor when the second switch means is opened, another FET means having drain means, source means and gate means.

current source input means parallel interconnected to the drain means of the other FET means and the gate means of both the other and the first FET means, the current source input means having a current source input that provides the gate voltage for both the first and the other FET means, the bias voltage means being parallel connected to the source means of both the first and the other FET means so as to provide the source voltage for both thereof, the current source output means of the first FET means being parallel interconnected to the source means of the second and third FET means, the current source output means of the first FET means providing a current source output of relatively small value to the source means of the second and third FET means so that the second and third FET means operate in the subthreshold mode and so that the current source output is linearly related to the current source input of the current source input means, and current differencing means having first and second input means and output means, the first and second input means of the current differencing means being connected to the drain means of the second and third FET means, the output means providing amplified multiplied current source output by reason of the product between the gate-to-source voltages of the second and third FET means as the result of a programmed analog voltage input being applied to the gate means of the second FET means and a reference analog voltage input being applied to the gate means of the third FET means.

27. A programmable analog vector-vector multiplier circuit means for a plurality of two or more programmable analog voltage multiplier circuit means, the vector-vector multiplier circuit means comprising:

a plurality of two or more programmable analog voltage multiplier circuit means, each analog voltage multiplier circuit means comprising high impedance analog voltage |HIAV| programming input means, input means and current source output means, a plurality of two or more switch means, first and second analog voltage input means, the first analog voltage input means providing a programmed analog voltage input of preselected value, the second analog voltage input means having separate output means, the capacitor means of each analog voltage multiplier circuit means being connected to the HIAV programming input means thereof, each switch means of the plurality being connected to the capacitor means of its associated analog voltage multiplier circuit means of the plurality of analog voltage multiplier circuit means, all switch means of the plurality of switch means being interconnected to the first analog voltage input means, the capacitor means of each analog voltage multiplier circuit means of the plurality for receiving and dynamically storing a programmed analog voltage input of preselected value from the first analog voltage input means when the switch means of the plurality associated with the capacitor means is closed and for applying the dynamically stored programmed analog voltage input to the HIAV programmed input of the multiplier circuit means associated therewith when the switch means of the plurality associated with the capacitor means is opened, each output means of the second analog voltage input means being connected to the input means of its associated analog voltage multiplier circuit means of the plurality, each output means of the second analog voltage input means providing an analog voltage input to the input means of each multiplier circuit means of the plurality, and current receiving means, the current source output means of each multiplier circuit means of the plurality being interconnected to the current receiving means, the current receiving means providing a summed output when the current source output means of each multiplier circuit means of the plurality provides a multiplied current source output as the result of the product of a programmed analog voltage input to the HIAV programming input of a given multiplier circuit means and an analog voltage input to the input means thereof during use of the vector-vector multiplier circuit means.

28. A vector-vector multiplier circuit means as set forth in claim 27 wherein the vector-vector multiplier circuit means is comprised of serial-to-parallel multiplexer means; wherein the multiplexer means is comprised of second analog voltage input means having a series of analog voltage inputs in serial format, wherein the multiplexer means is provided with a series of output means with each output means of the series being connected to the input means of its associated multiplier circuit means of the plurality so as to sequentially apply the series of analog voltage inputs of the second analog voltage input means to the input means of the plurality of multiplier circuit means of the vector-vector multiplier circuit means during its use.

29. A programmable analog vector-vector multiplier circuit means for a plurality of two or more programmable analog voltage multiplier circuit means, said programmable analog vector-vector multiplier circuit means comprising:

a plurality of two or more programmable analog voltage multiplier circuit means, each analog voltage multiplier circuit means of the plurality having at least a field effect transistor |FET| means and capacitor means, the FET means having gate means, input means and current source output means, a plurality of two or more switch means, first and second analog voltage input means the first analog voltage input means providing a programmed analog voltage input of preselected value, the second analog voltage input means having a series of output means, capacitor means for each analog voltage multiplier circuit means being connected to the gate means of the FET means thereof, each switch means of the plurality being connected to the capacitor means of its associated analog voltage multiplier circuit means of the plurality of analog voltage multiplier circuit means, all switch means of the plurality of switch means being interconnected to the first analog voltage input means, the capacitor means of each analog voltage multiplier circuit means of the plurality for receiving and dynamically storing a programmed analog voltage input of preselected value from the first analog voltage input means when the switch means of the plurality associated with the capacitor means is closed and for applying the dynamically stored programmed analog voltage input to the gate means of the FET means associated therewith so as to provide the gate voltage for the FET means associated therewith, when the switch means of the plurality associated with the capacitor means is opened, each output means of the series of the second analog voltage input means being connected to the input means of the FET means of its associated analog voltage multiplier circuit means of the plurality, each output means of the series of the second analog voltage input means providing an analog voltage input to the input means of the FET means of its associated analog voltage multiplier circuit means of the plurality so as to provide a drain-to-source voltage for each FET means, and current differencing means, the current source output means of each FET means of the plurality being interconnected to the current differencing means, the current differencing means providing a differenced output when the current source output means of each FET means of the plurality of analog voltage multiplier circuit means provides a multiplied current source output as the result of the product of the gate voltage and the drain-to-source voltage of each FET means of the plurality of the analog voltage multiplier circuit means during use of the analog vector-vector multiplier circuit means.

30. A vector-vector multiplier circuit means as set forth in claim 29, wherein the second analog voltage input means is comprised of serial-to-parallel multiplexer means, the multiplexer means provided with input means having a series of analog voltage inputs in serial format and a plurality of output means with each output means of the plurality having an analog voltage input of the series of analog voltage inputs of the second analog voltage input means; and wherein the analog voltage input of each output means of the multiplexer means is sequentially applied to its associated input means of the plurality multiplier circuit means during use of the vector-vector multiplier circuit means.

31. A programmable vector-matrix multiplier circuit means having a series of programmable analog voltage multiplier circuit means PAVMCM, each PAVMCM having a capacitor means associated therewith, the circuit means being with analog voltage input means and programmed analog voltage |PAV| inputs with each PAV input being dynamically stored on the capacitor means of its associated PAVMCM so that the dynamically stored PAV input for any PAVMCM of the circuit means forms the matrix of weighed means, the vector-matrix multiplier circuit means providing more than one series of multiplied and summed current outputs for each cycle of the vector-matrix multiplier circuit means, said vector-matrix multiplier circuit means comprising:

the series of selectively programmable analog voltage multiplier circuit means |PAVMCM| being arranged in both relatively spaced relationship to each other and intersecting row and column-like fashion so as to form a vector-matrix multiplier circuit means such that separate groups of the series thereof are arranged in row-like fashion in order that a plurality of two or more rows of PAVMCM of the series thereof also form a plurality of two or more columns of PAVMCM of the series thereof, each PAVMCM of the series thereof having and first and second n-channel field effect transistor |FET| means, each FET means of the first and second FET means having gate means, current source output means and input means, each capacitor means being connected to its associated gate means of the first FET means of a given PAVMCM of the series thereof, a series of X and a series of Y switch means, the series of X switch means corresponding in number to the plurality of rows of the PAVMCM the series of Y switch means corresponding in number to the series of PAVMCM, each Y switch means of the series being connected to the capacitor means of a given PAVMCM so that each Y switch means is only connected to its associated capacitor means of one PAVMCM of the series thereof, the programmable analog voltage |PAV| input means being parallel interconnected to each Y switch means of the series, each X switch means of the series along any row of the PAVMCM being connected to the PAV input means before any Y switch means along any row thereof, X and Y decoding means, the X decoding means having a series of output means, each output means of the X decoding means being connected to its associated X switch means of the series of X switch means, Y decoding means having a series of output means, each output means of the Y decoding means being connected to its associated Y switch means of the series of Y switch means, the X decoding means selectively providing an output to one of its output means of the series thereof for selectively closing the X switch means associated with the output of one of its output means of the series thereof during a programming operation of the vector-matrix multiplier circuit means, the Y decoding means selectively providing an output to one of its output means of the series thereof for selectively closing the Y switch means associated therewith during an operative cycle of the vector-matrix multiplier circuit means, whereby each selected output of the output means of the X and Y decoding means coordinate to direct a PAV input of the PAV input means to the capacitor means of a given PAVMCM so that the vector-matrix multiplier circuit means is operable in a given operative cycle for selecting one or more capacitor means and the PAVMCM associated therewith so as to provide one or more multiplied outputs from the series of PAVMCM, the capacitor means for each PAVMCM of the series thereof for receiving and dynamically storing a PAV input when certain X and Y switch means of the series of X and Y switch means are closed that is associated with a given PAVMCM as the result of outputs of selected output means of the X and Y decoding means, the capacitor means for applying the dynamically stored PAV input to the gate means of the first FET means of the given PAVMCM so as to provide the gate voltage therefor when these certain X and Y switch means are opened, a plurality of analog voltage input means, the plurality of analog voltage input means corresponding to the plurality of columns of the PAVMCM, each analog voltage input means of the plurality being parallel interconnected to the input means of the first and second FET means of each PAVMCM of a plurality of the PAVMCM along any given column of PAVMCM an analog voltage input of the plurality of analog voltage input means to a given PAVMCM of the series thereof providing the drain-to-source voltage for each FET means of the first and second FET means of the given PAVMCM of the series thereof, a plurality of reference analog voltage |RAV| input means, each RAV input means of the plurality being connected to its associated gate means of the second FET means of each PAVMCM of the series of PAVMCM of the vector-matrix circuit means, each RAV input means of the plurality providing a RAV input to its associated gate means of the second FET means of a given PAVMCM so as to provide the gate voltage therefor, and the output means of the first and second FET means of a given PAVMCM of the series providing a current difference output that is the product of the difference between the PAV input and the RAV input and the analog voltage input when a PAV input is applied to the gate means of the first FET means of a given PAVMCM, a RAV input is applied to the gate means of the second FET means of the given PAVMCM and an analog voltage input is applied to the input means of the first and second FET means of the given PAVMCM.

32. A vector-matrix multiplier circuit means as set forth in claim 31 wherein the vector-matrix multiplier circuit means is provided with a series of current differencing means, wherein each current summing means of the series is parallel interconnected to the output means of a group of PAVMCM for a given row of the of the vector-matrix multiplier circuit means, and wherein the output means of each current differencing means is connected to a parallel-to-serial analog voltage multiplexer means.

33. A vector-matrix multiplier circuit means as set forth in claim 31 wherein the vector-matrix multiplier circuit means is provided with serial-to-parallel multiplexer means for analog voltage input means, wherein the multiplexer means has input means for receiving analog voltage input means in serial format, wherein output means of the multiplexer means is comprised of a series of analog voltage outputs with each output being parallel interconnected to input means of a plurality of PAVMCM along a given column of the vector-matrix multiplier circuit means, and wherein the series of outputs are appropriately sequenced by the multiplexer means during each cycle of the vector-matrix multiplier circuit means in providing sequenced analog voltage inputs to the input means of two or more PAVMCM of the vector-matrix multiplier circuit means.

* * * * *